US011974095B2

(12) United States Patent
Wang

(10) Patent No.: US 11,974,095 B2
(45) Date of Patent: Apr. 30, 2024

(54) MEMS MICROPHONE

(71) Applicant: AAC Kaitai Technologies (Wuhan) CO., LTD, Hubei (CN)

(72) Inventor: Kaijie Wang, Shenzhen (CN)

(73) Assignee: AAC Kaital Technologies (Wuhan) CO., LTD, Wuhan (CN)

(*) Notice: Subject to any disclaimer, the term of this patent is extended or adjusted under 35 U.S.C. 154(b) by 171 days.

(21) Appl. No.: 17/833,915

(22) Filed: Jun. 7, 2022

(65) Prior Publication Data

US 2023/0199410 A1 Jun. 22, 2023

(30) Foreign Application Priority Data

Dec. 22, 2021 (CN) ......................... 202123254495.5

(51) Int. Cl.
*H04R 19/04* (2006.01)
*H04R 1/04* (2006.01)

(52) U.S. Cl.
CPC ............... *H04R 19/04* (2013.01); *H04R 1/04* (2013.01); *H04R 2201/003* (2013.01)

(58) Field of Classification Search
CPC .... H04R 19/04; H04R 1/04; H04R 2201/003; H04R 7/04; H04R 7/16; H04R 19/005
See application file for complete search history.

(56) References Cited

U.S. PATENT DOCUMENTS

| | | | | | |
|---|---|---|---|---|---|
| 8,169,042 | B2 * | 5/2012 | Weigold | H04R 19/005 | 381/174 |
| 8,170,244 | B2 * | 5/2012 | Ryan | H04R 1/406 | 381/174 |
| 8,325,950 | B2 * | 12/2012 | Li | H04R 31/00 | 381/174 |
| 8,331,589 | B2 * | 12/2012 | Wu | H04R 19/005 | 381/174 |
| 8,731,220 | B2 * | 5/2014 | Zhang | H04R 19/04 | 381/174 |
| 11,553,283 | B2 * | 1/2023 | Toft | H04R 3/00 | |
| 11,598,821 | B2 * | 3/2023 | Jørgensen | H04R 3/04 | |
| 2008/0130920 | A1 * | 6/2008 | Yonehara | H01G 5/014 | 381/174 |
| 2010/0052082 | A1 * | 3/2010 | Lee | B81B 7/0061 | 257/E29.001 |
| 2012/0093346 | A1 * | 4/2012 | Feiertag | H04R 19/005 | 381/174 |

(Continued)

*Primary Examiner* — Akelaw Teshale
(74) *Attorney, Agent, or Firm* — W&G Law Group

(57) ABSTRACT

A MEMS microphone includes a substrate, a connecting base, and a capacitance system. Connecting ports are formed on the connecting base, where the at least two connecting ports are recessed outwards from an inner wall of the connecting base and are disposed at intervals. The capacitance system includes a system main body and connecting pins. A system main body of the capacitance system is fixed to the connecting ports of the connecting base through the connecting pins. In addition, the slit is formed between the outer side of the system main body and the inner wall of the connecting base, the capacitance system is stably and reliably assembled in the connecting base through a connecting structure where the connecting pins are matched with the connecting ports, and compliance of vibration of the system main body of the capacitance system is increased through matching the connecting pins with slit.

9 Claims, 5 Drawing Sheets

(56) References Cited

U.S. PATENT DOCUMENTS

| | | | | |
|---|---|---|---|---|
| 2012/0189144 | A1* | 7/2012 | Delaus | B81C 1/0023 381/174 |
| 2013/0016859 | A1* | 1/2013 | Buck | H04R 7/26 381/174 |
| 2013/0094675 | A1* | 4/2013 | Je | H04R 31/00 381/174 |
| 2013/0140655 | A1* | 6/2013 | Yeh | H04R 31/006 438/51 |
| 2014/0003632 | A1* | 1/2014 | Reinisch | B81C 1/0023 381/174 |
| 2015/0237429 | A1* | 8/2015 | Ryan | H04R 19/04 381/174 |
| 2019/0394547 | A1* | 12/2019 | Lemons | H04R 1/028 |
| 2021/0076141 | A1* | 3/2021 | Lee | H04R 19/005 |

* cited by examiner

MEMS MICROPHONE

TECHNICAL FIELD

The present disclosure relates to the field of electroacoustic conversion, and in particular to a MEMS microphone.

BACKGROUND

With development of wireless communication, user requirements on voice quality of mobile phones become higher and higher. Microphones serve as a voice pickup device of the mobile phones, a design of which directly affects the voice quality of the mobile phones.

At present, microphones widely used in the mobile phones are Micro-Electro-Mechanical System (MEMS) microphones, which are related to the present disclosure and includes a substrate and a capacitance system composed of a vibration structure. The vibration structure vibrates in response to sound waves, so that capacitance of the capacitance system is changed and a sound wave signal is converted into an electric signal. However, in the related art, a structure of the capacitance system and a way the capacitance system is connected the substrate may lead to problems of excessive tension and insufficient compliance of the vibration structure, thereby affecting performance of the microphone.

SUMMARY

The present disclosure aims to provide a MEMS microphone to solve problems in the related art that a structure of a capacitance system and a way the capacitance system is connected a substrate may lead to problems of excessive tension and insufficient compliance of a vibration structure, thereby affecting performance of a microphone.

The present disclosure provides a MEMS microphone, including a substrate, a connecting base, and a capacitance system. The substrate includes a back cavity. The connecting base is disposed on one side of the substrate and encloses one side of the back cavity, and the capacitance system is disposed in the connecting base. At least two connecting ports are formed on the connecting base, where the at least two connecting ports are recessed outwards from an inner wall of the connecting base and are disposed at intervals. The capacitance system includes a system main body and connecting pins, the system main body is accommodated inside the connecting base and suspends on the one side of the back cavity, and the connecting pins extend outwards from the system main body and correspond one-to-one with the at least two connecting ports. The connecting pins are recessed in the at least two connecting ports and are fixed to the connecting base, a slit is formed between an outer side of the system main body and an inner wall of the connecting base.

As an improvement, each of the connecting pins includes a connecting section and a connecting portion, the connecting section extends outwards from the system main body and the connecting portion is connected to one end of the connecting section, where the one end of the connecting section is distal from the system main body. The connecting section extends into a corresponding one of the at least two connecting ports, and one side of the connecting portion is fixed to the connecting base, where the one side of the connecting portion is distal from the system main body.

As an improvement, the capacitance system further includes first insulating members, each of the first insulating members is disposed between adjacent two of the connecting pins, and the first insulating members surround outer sides of the system main body. An end portion of each of the first insulating members extends from the system main body and extends and bends along one side of a corresponding one of the connecting pins towards the connecting base.

As an improvement, the capacitance system further includes elastic members, and the elastic members are connected to the first insulating members and the inner wall of the connecting base.

As an improvement, the elastic members are in an annular band shape. Each of the elastic members includes a first connecting band and a second connecting band, the first connecting band extends along the inner wall of the connecting base, the second connecting band is connected to the first connecting band and extends along a surface of each of the first insulating members. A gap is formed between the first connecting band and the second connecting band.

As an improvement, the capacitance system includes a back plate assembly, first electrodes, and second electrodes. The back plate assembly is fixed to the connecting base, the first electrodes are fixed to the connecting base and are disposed on a first side of the back plate assembly at intervals, where the first side of the back plate assembly is close to the substrate, and the second electrodes are fixed to the connecting base and disposed on a second side of the back plate assembly at intervals, where the second side of the back plate assembly is distal from the substrate.

The back plate assembly includes a back plate main body and back plate supporting pins, where the back plate supporting pins extend outwards from outer sides of the back plate main body. Each of the first electrodes includes a first electrode main body and a first electrode supporting pin, where the first electrode supporting pin extends outwards from an outer side of the first electrode main body. Each of the second electrodes includes a second electrode main body and a second electrode supporting pin, where the second electrode supporting pin extends outwards from an outer side of the second electrode main body. A corresponding one of the back plate supporting pins, the first electrode supporting pin, and the second electrode correspond one to another. The system main body includes the back plate main body, the first electrode main body, and the second electrode main body, and the each of the connecting pins includes a corresponding one of the back plate supporting pins, the first electrode supporting pin, and the second electrode supporting pin.

The first insulating members surround outer sides of the back plate assembly, the first electrodes, and the second electrodes. The connecting base, the first insulating members, the first electrodes, and the second electrodes jointly enclose to form a sealed space.

As an improvement, the capacitance system further includes second insulating members, the second insulating members penetrate through the back plate assembly and two ends of each of the second insulating members are respectively fixed to a corresponding one of the first electrodes and a corresponding one of the second electrodes, and a groove structure is defined at an end of each of the second insulating members.

As an improvement, the system main body is connected with the second insulating members. In one of the connecting pins, the corresponding one of the back plate supporting pins, the first electrode supporting pin, and the second electrode supporting pin are connected to a corresponding one of the second insulating members.

As an improvement, the system main body includes at least two of the second insulating members, the at least two of the second insulating members of the system main body are disposed at intervals around a center of the system main body in an equal angle.

As an improvement, the back plate assembly includes a back plate, a first back plate electrode, and a second back plate electrode. The back plate is fixed to the connecting base, the first back plate electrode is stacked on a first side of the back plate, where the first side of the back plate is close to the substrate, and the second back plate electrode is stacked on a second side of the back plate, where the second side of the back plate is distal from the substrate.

Beneficial effects of the present disclosure are as following.

The present disclosure provides the MEMS microphone, the capacitance system of the MEMS microphone is configured to convert a sound wave signal into an electric signal, and the system main body of the capacitance system is fixed to the connecting ports of the connecting base through the connecting pins. In addition, the slit is formed between the outer side of the system main body and the inner wall of the connecting base, the capacitance system is stably and reliably assembled in the connecting base through a connecting structure where the connecting pins are matched with the connecting ports, and compliance of vibration of the system main body of the capacitance system is increased through matching the connecting pins with slit, thereby improving performance of microphones.

DETAILED DESCRIPTION OF EMBODIMENTS

The present disclosure is further described below with reference to the accompanying drawings and embodiments.

Figure 1:
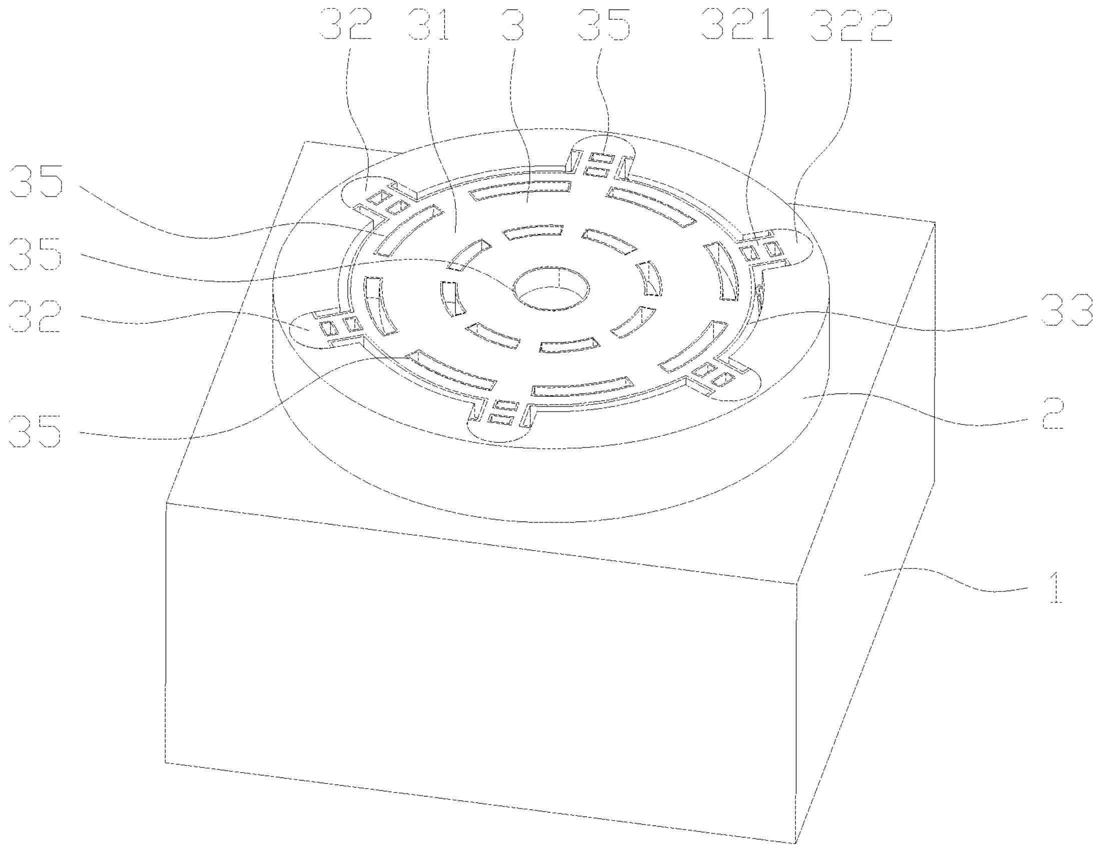
FIG. 1 is an overall structural schematic diagram of a MEMS microphone of the present disclosure.
Figure 2:
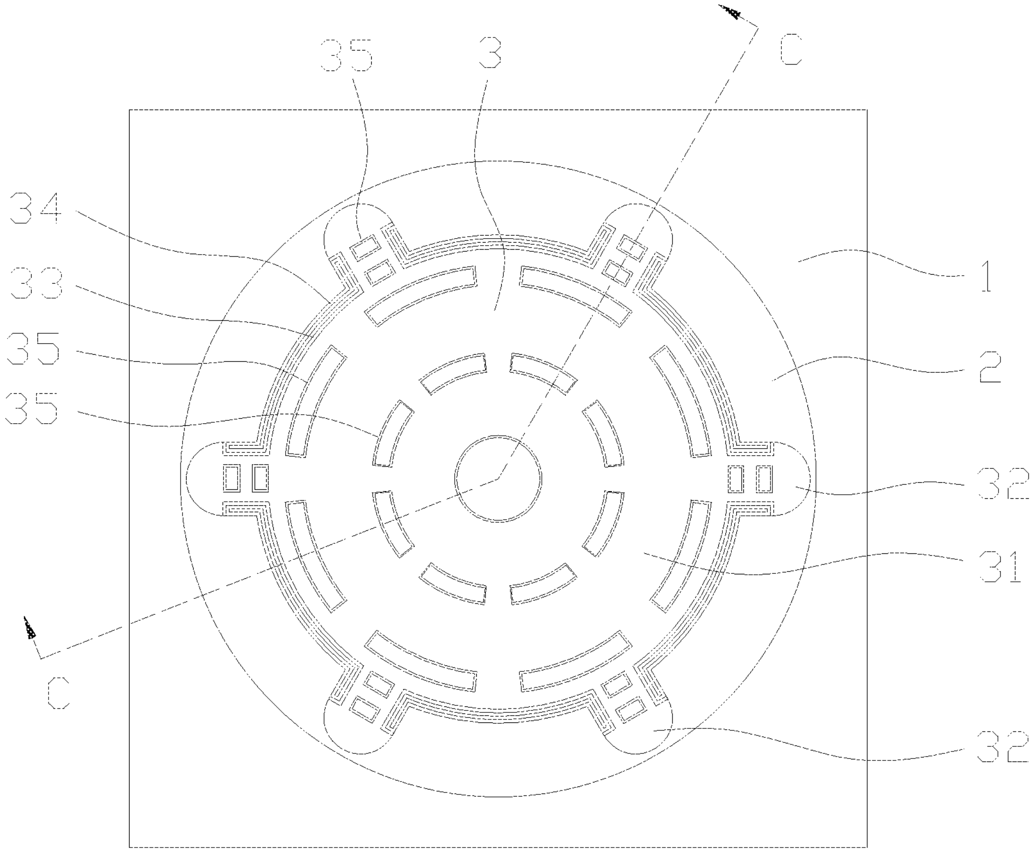
FIG. 2 is a top schematic diagram of the MEMS microphone of the present disclosure.
Figure 3:
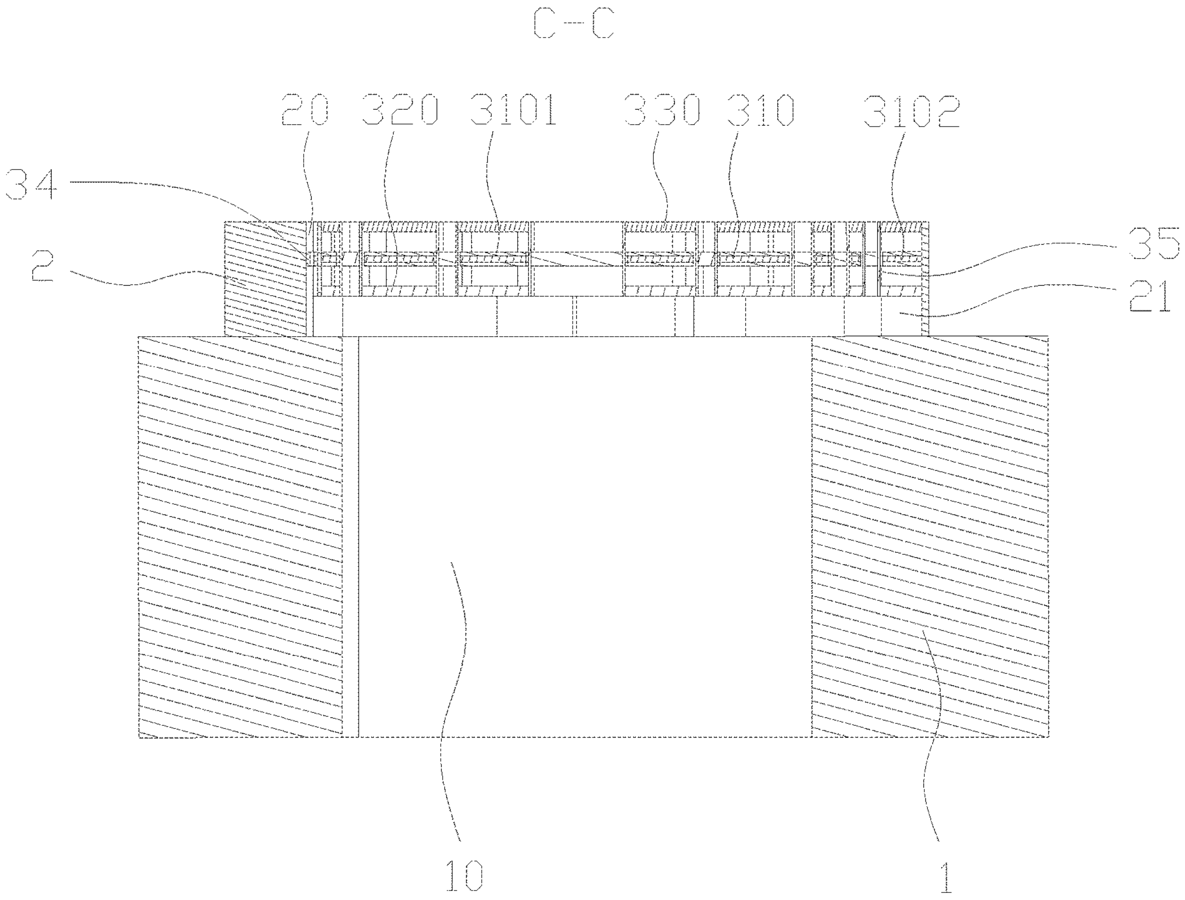
FIG. 3 is a cross-sectional schematic diagram taken along the line C-C shown in the MEMS microphone of FIG. 2.
Figure 4:
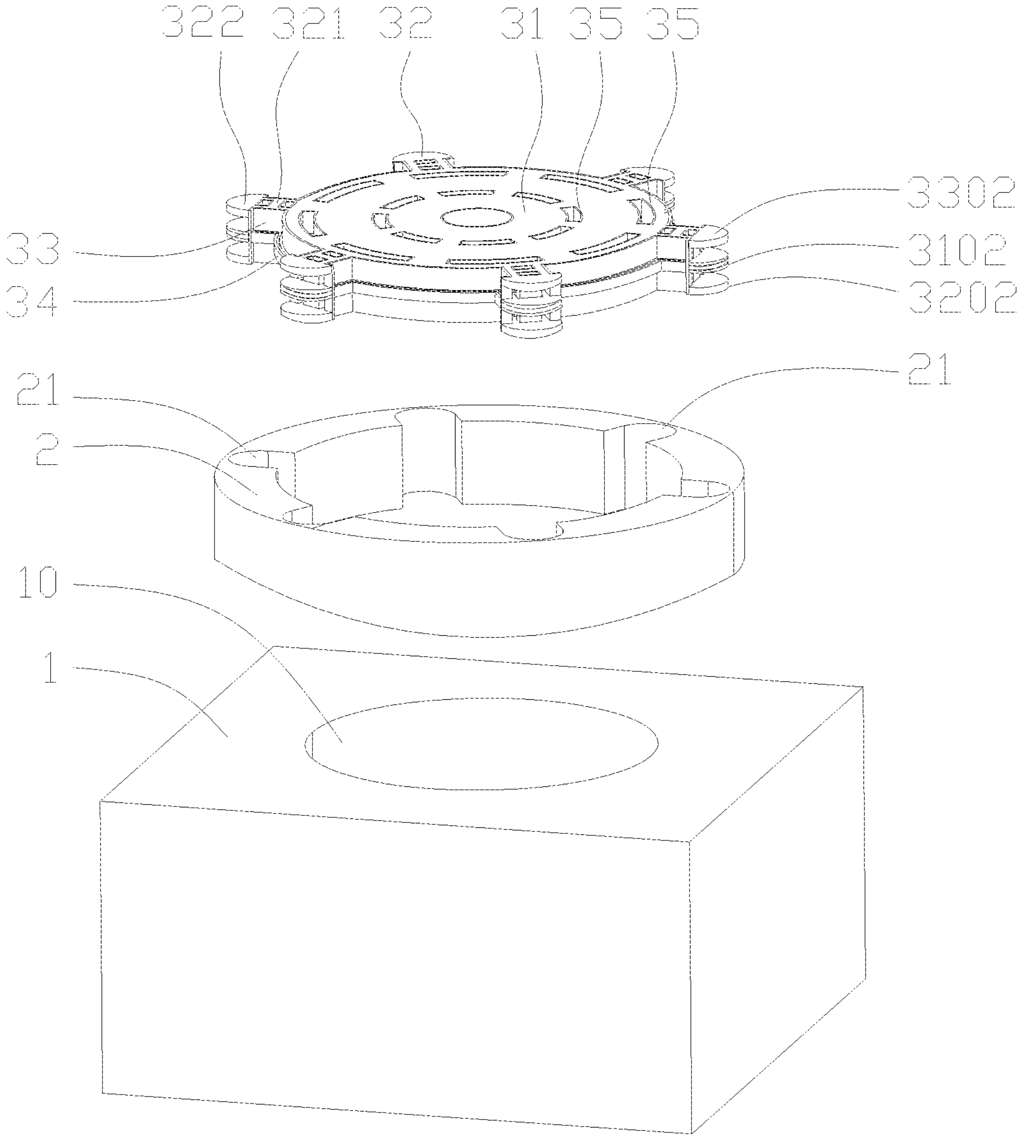
FIG. 4 is a first exploded schematic diagram of the MEMS microphone of the present disclosure.
Figure 5:
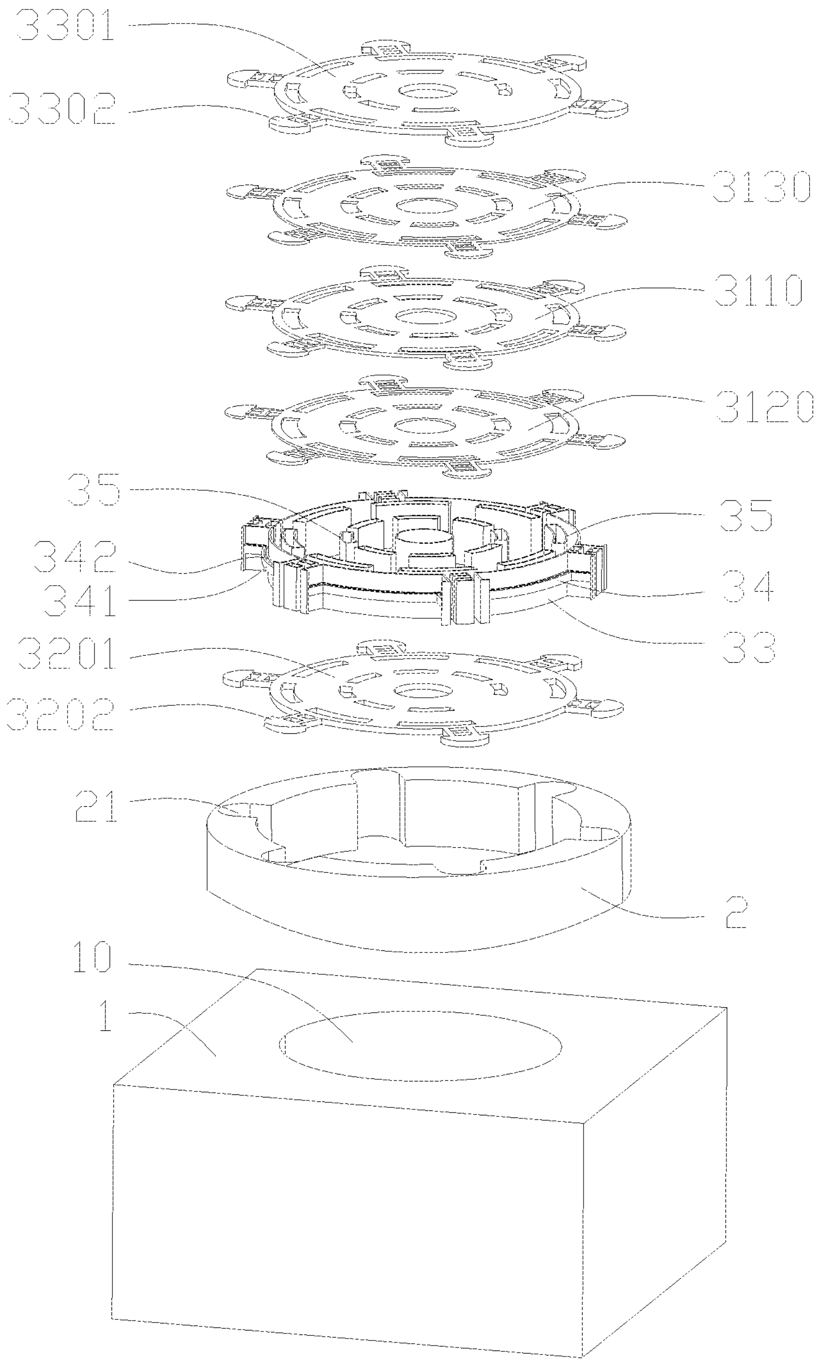
FIG. 5 is a second exploded schematic diagram of the MEMS microphone of the present disclosure.

The present disclosure provides a MEMS microphone, as shown in FIGS. 1-5, the MEMS microphone includes a substrate 1, a connecting base 2, and a capacitance system 3. The substrate 1 includes a back cavity 10. The connecting base 2 is disposed on one side of the substrate 1 and encloses one side of the back cavity 10, and the capacitance system 3 is disposed in the connecting base 2. At least two connecting ports 21 are formed on the connecting base 2, where the at least two connecting ports 21 are recessed outwards from an inner wall of the connecting base 2 and are disposed at intervals. The capacitance system 3 includes a system main body 31 and connecting pins 32, the system main body 31 is accommodated inside the connecting base 2 and suspends on the one side of the back cavity 10, and the connecting pins 32 extend outwards from the system main body 31 and correspond one-to-one with the at least two connecting ports 21. The connecting pins 32 are recessed in the at least two connecting ports 21 and are fixed to the connecting base 2, a slit 20 is formed between an outer side of the system main body 31 and an inner wall of the connecting base 2.

In the embodiment, the capacitance system 3 is configured to convert a sound wave signal into an electric signal, and the system main body 31 of the capacitance system 3 is fixed to the connecting ports 21 of the connecting base 2 through the connecting pins 32. In addition, the slit 20 is formed between the outer side of the system main body 31 and the inner wall of the connecting base 2, the capacitance system 3 is stably and reliably assembled in the connecting base 2 through a connecting structure where the connecting pins 32 are matched with the connecting ports 31, and compliance of vibration of the system main body 31 of the capacitance system 3 is increased through matching the connecting pins 32 with slit 20, thereby improving performance of microphones.

Each of the connecting pins 32 includes a connecting section 321 and a connecting portion 322, the connecting section 321 extends outwards from the system main body 31 and the connecting portion 322 is connected to one end of the connecting section 321, where the one end of the connecting section 321 is distal from the system main body 31. The connecting section 321 extends into a corresponding one of the at least two connecting ports 21, and one side of the connecting portion 322 is fixed to the connecting base 2, where the one side of the connecting portion 322 is distal from the system main body 31. Specifically, in the embodiment, an inner space of the back cavity 10 is in a cylindrical structure, the connecting base 2 is in a circular ring shape, the system main body 31 is in a cylindrical shape, and the back cavity 10, the connecting base 2, and the system main body 31 are coaxial. One side, facing away from the substrate 1, of the system main body 31 is flush with a side surface, facing away from the substrate, of the system main body 31. Six of the connecting pins are disposed at intervals on outer sides of the system main body 31 at an equal angle, and the connecting portion 322 of each of the connecting pins 32 is in a half-moon shape. Correspondingly, six of the connecting ports 21 are formed on the connecting base 2, an inner side surface of each of the connecting ports 21 are a circular ring surface to be matched with the connecting portion 322. The connecting portion 322 is fixedly connected to an inner side of each of the connecting portions, thereby ensuring connection stability between the system main body 31 and the connecting base 2. Two sides of the connecting portion 321 and two sides of a corresponding one of the connecting ports are spaced apart, thereby ensuring reliability of vibration of system main body 31. In some embodiments, two, three, four, five, seven, or eight or more of the connecting pins 32 are selected to dispose on the outer sides of the system main body 31, and a specific number of the connecting pins may be adaptively selected according to actual situations. Further, the connecting pins 32 are optionally disposed at intervals around a center of the system main body 31 at an equal angle. Certainly, angles between each adjacent two of the connecting pins are optionally different. In some embodiments, the back cavity 10 is selected to be in a cylindrical shape, a triangular prism shape, a quadrangular prism shape, a pentagonal prism shape or others belonging to a cavity, the connecting base 2 is selected to be in a triangular ring shape, a quadrilateral ring shape, a pentagonal ring shape or others, and the system main body 31 is selected to be in a triangular ring, a quadrilateral ring, a pentagonal ring or others. It should be understood that shapes of the back cavity 10, the connecting base 2, and the system main body 31 may be adaptively selected according to actual situations, which are not limited herein.

The capacitance system 3 further includes first insulating members 33, each of the first insulating members 33 is disposed between adjacent two of the connecting pins 32, and the first insulating members 33 surround the outer sides of the system main body 31. An end portion of each of the first insulating members 33 extends from the system main body 31 and extends and bends along one side of a corresponding one of the connecting pins 32 towards the connecting base 2. Specifically, the first insulating members 3 wrap partial outer sides of the system main body 31 and the connecting pins 32, where the partial outer sides of the system main body 31 and the connecting pins 32 are not connected with the connecting base 2, thereby strengthening a structure of the system main body 31 and the connecting pins 32.

In order to further improve stability of the capacitance system to improve the performance of the microphones, the capacitance system 3 further includes elastic members 34, and the elastic members 34 are connected to the first insulating members 33 and the inner wall of the connecting base 2. Specifically, the elastic members 34 are in an annular band shape. Each of the elastic members 34 includes a first connecting band 341 and a second connecting band 342, the first connecting band 341 extends along the inner wall of the connecting base 2, the second connecting band 342 is connected to the first connecting band 341 and extends along a surface of each of the first insulating members 33. A gap is formed between the first connecting band 341 and the second connecting band 342. The first connecting band 341 is fixedly connected to the connecting base 2, and on the one hand, the second connecting band 342 enhances structural strength of the first insulating members 33, on the other hand, the second connecting band 342 is cooperated with the first connecting band 341 to achieve connection between the capacitance system 3 and the connecting base 2, thereby preventing the system main body 31 from vibrating in a radial direction.

The capacitance system 3 includes a back plate assembly 310, first electrodes 320, and second electrodes 330. The back plate assembly 310 is fixed to the connecting base 2, the first electrodes 320 are fixed to the connecting base 2 and are disposed on a first side of the back plate assembly 310 at intervals, where the first side of the back plate assembly 310 is close to the substrate 1, and the second electrodes 330 are fixed to the connecting base 2 and disposed on a second side of the back plate assembly 310 at intervals, where the second side of the back plate assembly 310 is distal from the substrate 1. The back plate assembly 310 includes a back plate main body 3101 and back plate supporting pins 3102, where the back plate supporting pins 3102 extend outwards from outer sides of the back plate main body 3101. Each of the first electrodes 320 includes a first electrode main body 3201 and a first electrode supporting pin 3202, where the first electrode supporting pin 3202 extends outwards from an outer side of the first electrode main body 3201. Each of the second electrodes 330 includes a second electrode main body 3301 and a second electrode supporting pin 3302, where the second electrode supporting pin 3302 extends outwards from an outer side of the second electrode main body 3301. A corresponding one of the back plate supporting pins 3102, the first electrode supporting pin 3202, and the second electrode 3302 correspond one to another. The system main body 31 includes the back plate main body 3101, the first electrode main body 3201, and the second electrode main body 3301, and the each of the connecting pins 32 includes a corresponding one of the back plate supporting pins 3102, the first electrode supporting pin 3202, and the second electrode supporting pin 3302. The first insulating members 33 surround outer sides of the back plate assembly 310, the first electrodes 320, and the second electrodes 330. The connecting base 2, the first insulating members 33, the first electrodes 320, and the second electrodes 330 jointly enclose to form a sealed space. The back plate assembly 310 includes a back plate 3110, a first back plate electrode 3120, and a second back plate electrode 3130. The back plate 3110 is fixed to the connecting base 2, the first back plate electrode 3120 is stacked on a first side of the back plate 3110, where the first side of the back plate 3110 is close to the substrate 1, and the second back plate electrode 3130 is stacked on a second side of the back plate 3110, where the second side of the back plate 3110 is distal from the substrate 1. In the embodiment, shapes of the back plate assembly 310, the first electrodes 320, and the third electrodes 330 are the same. Each of the first electrodes 320 and each of the second electrodes serve as two vibration diaphragms, the first electrodes 320 and the second electrodes 330 are spaced apart from each other and form a differential output with the back plate assembly 310, pressure in the sealed space is less than external pressure, so that a low vacuum region is formed, and noise between the back plate assembly 310, the first electrodes 320, and the second electrodes 330 is further reduced.

The capacitance system 3 further includes second insulating members 35, the second insulating members 35 penetrate through the back plate assembly 310 and two ends of each of the second insulating members 35 are respectively fixed to a corresponding one of the first electrodes 320 and a corresponding one of the second electrodes 330, and a groove structure is defined at an end of each of the second insulating members 35. The system main body 31 is connected with the second insulating members 35. In one of the connecting pins 32, the corresponding one of the back plate supporting pins 3102, the first electrode supporting pin 3202, and the second electrode supporting pin 3302 are connected to a corresponding one of the second insulating members 35. Through the second insulating members 35 having the groove structure at the end disposed between the first electrodes 320, the second electrodes 330, and the back plate assembly 310, pleated structures are formed on the first electrodes 320 and the second electrodes 330, thereby increasing compliance of a diaphragm structure and improving the performance of the microphones.

The system main body 31 includes at least two of the second insulating members 35, the at least two of the second insulating members 35 of the system main body 31 are disposed at intervals around the center of the system main body 31 in an equal angle. Specifically in the embodiment, one of the second insulating members 35 is disposed on the center of the system main body 31, and six sets of the second insulating members 35 are disposed at intervals around the center of the system main body 31 at an equal angle, each set of the six sets includes two of the second insulating members 35 disposed in a radial direction of the system main body 31, the second insulating members 35 in the six sets are in an arc-shape and are coaxial with the system main body 31, and a connecting lines of centers of the two of the second insulating members 35 in each set of the six sets is an symmetric axes of the connecting pins on both sides of the two of the second insulating members 35 in each set of the six sets. In some embodiments, there are also three sets, four sets, five sets, or others of the second insulating members 35 disposed on the system main body 31. Each of the three sets, the four sets, the five sets, or the others of the second insulating members 35 further includes one, two, three, or others of the second insulating members 35. Through the second insulating members, compliance of the system main body 31 is further improved.

In the embodiment, parallel two of the second insulating members 35 are disposed at each of the connecting pins 32, where the parallel two of the second insulating members 35 are rectangular in a vibration direction view, and a length direction of which is the same as a width direction of a corresponding one of the connecting pins 32. The parallel two of the second insulating members 35 are disposed at intervals along an extension direction of the corresponding one of the connecting pins 32. Through the way that the second insulating members 35 are disposed at each of the connecting pins 32, compliance of the vibration diaphragm is further increased.

In the embodiment, the first insulating members 33, the elastic members 34 and the second insulating members 35 may be made of an undoped polysilicon material or a SiN material, or another one or more layers of insulating material may be used.

The foregoing are merely embodiments of the present disclosure, and it should be noted that, for those who skilled in the art, improvements can be made without departing from the concepts of the present disclosure, but these are all within the protection scopes of the present disclosure.

What is claimed is:

1. A Micro-Electro-Mechanical System (MEMS) microphone, comprising:

a substrate;

a connecting base; and a capacitance system;

wherein the substrate comprises a back cavity, the connecting base is disposed on one side of the substrate and encloses one side of the back cavity, and the capacitance system is disposed in the connecting base; at least two connecting ports are formed on the connecting base, where the at least two connecting ports are recessed outwards from an inner wall of the connecting base and are disposed at intervals; the capacitance system comprises a system main body and connecting pins, the system main body is accommodated inside the connecting base and suspends on the one side of the back cavity, and the connecting pins extend outwards from the system main body and correspond one-to-one with the at least two connecting ports; the connecting pins are recessed in the at least two connecting ports and are fixed to the connecting base, a slit is formed between outer sides of the system main body and an inner wall of the connecting base;

the capacitance system comprises a back plate assembly, first electrodes, and second electrodes; the back plate assembly is fixed to the connecting base, the first electrodes are fixed to the connecting base and are disposed on a first side of the back plate assembly at intervals, where the first side of the back plate assembly is close to the substrate, and the second electrodes are fixed to the connecting base and disposed on a second side of the back plate assembly at intervals, where the second side of the back plate assembly is distal from the substrate;

the back plate assembly comprises a back plate main body and back plate supporting pins, where the back plate supporting pins extend outwards from outer sides of the back plate main body; each of the first electrodes comprises a first electrode main body and a first electrode supporting pin, where the first electrode supporting pin extends outwards from an outer side of the first electrode main body; each of the second electrodes comprises a second electrode main body and a second electrode supporting pin, where the second electrode supporting pin extends outwards from an outer side of the second electrode main body; a corresponding one of the back plate supporting pins, the first electrode supporting pin, and the second electrode correspond one to another; the system main body comprises the back plate main body, the first electrode main body, and the second electrode main body; and the each of the connecting pins comprises a corresponding one of the back plate supporting pins, the first electrode supporting pin, and the second electrode supporting pin; and the first insulating members surround outer sides of the back plate assembly, the first electrodes, and the second electrodes; the connecting base, the first insulating members, the first electrodes, and the second electrodes jointly enclose to form a sealed space.

2. The MEMS microphone according to claim 1, wherein each of the connecting pins comprises a connecting section and a connecting portion, the connecting section extends outwards from the system main body and the connecting portion is connected to one end of the connecting section, where the one end of the connecting section is distal from the system main body; the connecting section extends into a corresponding one of the at least two connecting ports, and one side of the connecting portion is fixed to the connecting base, where the one side of the connecting portion is distal from the system main body.

3. The MEMS microphone according to claim 1, wherein the capacitance system further comprises first insulating members, each of the first insulating members is disposed between adjacent two of the connecting pins, and the first insulating members surround an outer side of the system main body; an end portion of each of the first insulating members extends from the system main body and extends and bends along one side of a corresponding one of the connecting pins towards the connecting base.

4. The MEMS microphone according to claim 3, wherein the capacitance system further comprises elastic members, and the elastic members are connected to the first insulating members and the inner wall of the connecting base.

5. The MEMS microphone according to claim 4, wherein the elastic members are in an annular band shape; each of the elastic members comprises a first connecting band and a second connecting band, the first connecting band extends along the inner wall of the connecting base, the second connecting band is connected to the first connecting band and extends along a surface of each of the first insulating members; a gap is formed between the first connecting band and the second connecting band.

6. The MEMS microphone according to claim 1, wherein the capacitance system further comprises second insulating members, the second insulating members penetrate through the back plate assembly and two ends of each of the second insulating members are respectively fixed to a corresponding one of the first electrodes and a corresponding one of the second electrodes, and a groove structure is defined at an end of each of the second insulating members.

7. The MEMS microphone according to claim 6, wherein the system main body is connected with the second insulating members; in one of the connecting pins, the corresponding one of the back plate supporting pins, the first electrode supporting pin, and the second electrode supporting pin are connected to a corresponding one of the second insulating members.

8. The MEMS microphone according to claim 7, wherein the system main body comprises at least two of the second insulating members, the at least two of the second insulating members of the system main body are disposed at intervals around a center of the system main body in an equal angle.

9. The MEMS microphone according to claim 1, wherein the back plate assembly comprises a back plate, a first back plate electrode, and a second back plate electrode; the back plate is fixed to the connecting base, the first back plate electrode is stacked on a first side of the back plate, where the first side of the back plate is close to the substrate, and the second back plate electrode is stacked on a second side of the back plate, where the second side of the back plate is distal from the substrate.

* * * * *